United States Patent
Kwon et al.

(10) Patent No.: US 12,237,512 B2
(45) Date of Patent: Feb. 25, 2025

(54) BINDER COMPOSITION FOR NEGATIVE ELECTRODE, NEGATIVE ELECTRODE, AND SECONDARY BATTERY

(71) Applicant: LG ENERGY SOLUTION, LTD., Seoul (KR)

(72) Inventors: Yo Han Kwon, Daejeon (KR); Joonwon Lim, Daejeon (KR); Min Chul Jang, Daejeon (KR); Sun Kyu Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 577 days.

(21) Appl. No.: 17/608,073

(22) PCT Filed: Dec. 22, 2020

(86) PCT No.: PCT/KR2020/018877
§ 371 (c)(1),
(2) Date: Nov. 1, 2021

(87) PCT Pub. No.: WO2021/133027
PCT Pub. Date: Jul. 1, 2021

(65) Prior Publication Data
US 2022/0320517 A1 Oct. 6, 2022

(30) Foreign Application Priority Data

Dec. 27, 2019 (KR) .................. 10-2019-0176460

(51) Int. Cl.
*H01M 4/62* (2006.01)
*H01M 4/02* (2006.01)
(Continued)

(52) U.S. Cl.
CPC ......... *H01M 4/622* (2013.01); *H01M 4/0404* (2013.01); *H01M 4/48* (2013.01);
(Continued)

(58) Field of Classification Search
CPC ...... H01M 4/622; H01M 4/0404; H01M 4/48; H01M 4/134; H01M 4/1395; H01M 4/386;
(Continued)

(56) References Cited

U.S. PATENT DOCUMENTS 6,537,468 B1 * 3/2003 Hata .................. C08F 8/30
429/105
2007/0264570 A1 11/2007 Oh et al.
(Continued)

FOREIGN PATENT DOCUMENTS

CN 101507020 A 8/2009
CN 104813525 A 7/2015
(Continued)

OTHER PUBLICATIONS

Nagarkar et al., "Polyvinyl Alcohol: A Comprehensive Study," Mar. 12, 2019, Acta Scientific Pharmaceutical Sciences, 3.4, 34-44. (Year: 2019).*

(Continued)

*Primary Examiner* — Matthew W Van Oudenaren
(74) *Attorney, Agent, or Firm* — Birch, Stewart, Kolasch & Birch, LLP

(57) ABSTRACT

Disclosed is a binder composition for a negative electrode which includes a binder polymer containing at least one first functional group selected from the group consisting of a hydroxy group and a carboxyl group, and a crosslinked polymer containing at least one second functional group selected from the group consisting of an amino group and an isocyanate group, wherein the crosslinked polymer is present in an amount of 1.5 parts by weight to 8.5 parts by weight based on 100 parts by weight of the binder polymer.

11 Claims, 1 Drawing Sheet

(51) Int. Cl.
   *H01M 4/04*     (2006.01)
   *H01M 4/134*    (2010.01)
   *H01M 4/1395*   (2010.01)
   *H01M 4/38*     (2006.01)
   *H01M 4/48*     (2010.01)

(52) U.S. Cl.
   CPC ...... *H01M 2004/027* (2013.01); *H01M 4/134* (2013.01); *H01M 4/1395* (2013.01); *H01M 4/386* (2013.01); *H01M 4/621* (2013.01); *H01M 4/623* (2013.01)

(58) Field of Classification Search
   CPC ................ H01M 4/621; H01M 4/623; H01M 2004/027
   See application file for complete search history.

(56) References Cited

U.S. PATENT DOCUMENTS

| | | | |
|---|---|---|---|
| 2010/0047693 | A1 | 2/2010 | Yang et al. |
| 2012/0189915 | A1 | 7/2012 | Cho et al. |
| 2015/0280238 | A1 | 10/2015 | Hellring et al. |
| 2015/0287993 | A1 | 10/2015 | Komaba et al. |
| 2016/0028084 | A1* | 1/2016 | Lee ................ C01B 33/113 216/13 |
| 2016/0204439 | A1 | 7/2016 | Sonobe |
| 2016/0308216 | A1 | 10/2016 | Hellring et al. |
| 2017/0040615 | A1 | 2/2017 | Kurihara |
| 2018/0026270 | A1* | 1/2018 | Bae ................ H01M 4/382 429/217 |
| 2018/0138508 | A1 | 5/2018 | Komaba et al. |
| 2018/0226641 | A1 | 8/2018 | Yang et al. |
| 2018/0301705 | A1 | 10/2018 | Hellring et al. |
| 2021/0202950 | A1 | 7/2021 | Hellring et al. |

FOREIGN PATENT DOCUMENTS

| | | | |
|---|---|---|---|
| CN | 106463705 | A | 2/2017 |
| CN | 107611344 | A | 1/2018 |
| CN | 108520959 | A | 9/2018 |
| JP | 3564880 | * | 9/2004 |
| JP | 2015-204133 | A | 11/2015 |
| JP | 2015204133 | * | 11/2015 |
| JP | 2016-46151 | A | 4/2016 |
| JP | 2017-4682 | A | 1/2017 |
| JP | 2017-45517 | A | 3/2017 |
| JP | 6481609 | B2 | 3/2019 |
| KR | 2001-0025102 | A | 3/2001 |
| KR | 10-2007-0076144 | A | 7/2007 |
| KR | 10-2008-0017113 | A | 2/2008 |
| KR | 10-2012-0134025 | A | 12/2012 |
| KR | 10-1591712 | B1 | 2/2016 |
| KR | 10-2016-0138552 | A | 12/2016 |
| KR | 10-2017-0110840 | A | 10/2017 |
| KR | 10-2018-0115813 | A | 10/2018 |
| KR | 10-2019-0051375 | A | 5/2019 |
| WO | WO 2018/068268 | A1 | 4/2018 |
| WO | WO2018068268 | * | 4/2018 |

OTHER PUBLICATIONS

International Search Report for PCT/KR2020/018877 mailed on Apr. 2, 2021.
Extended European Search Report for European Application No. 20905355.2, dated Jul. 18, 2022.

* cited by examiner

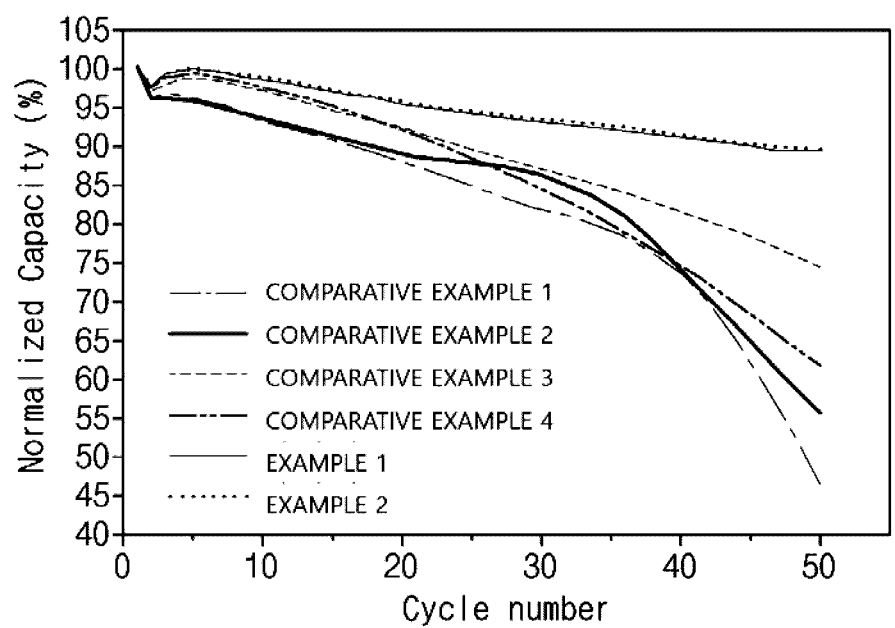

BINDER COMPOSITION FOR NEGATIVE ELECTRODE, NEGATIVE ELECTRODE, AND SECONDARY BATTERY

CROSS-REFERENCE TO RELATED APPLICATIONS

This application claims priority from Korean Patent Application No. 10-2019-0176460, filed on Dec. 27, 2019, the disclosure of which is incorporated by reference herein.

TECHNICAL FIELD

The present invention relates to a binder composition for a negative electrode, a negative electrode, and a secondary battery.

BACKGROUND ART

Recently, with the rapid spread of electronic devices using batteries, such as mobile phones, notebook computers, and electric vehicles, demand for secondary batteries with relatively high capacity as well as small size and lightweight has been rapidly increased. Particularly, since a lithium secondary battery is lightweight and has high energy density, the lithium secondary battery is in the spotlight as a driving power source for portable devices. Accordingly, research and development efforts for improving the performance of the lithium secondary battery have been actively conducted.

In general, the lithium secondary battery includes a positive electrode, a negative electrode, a separator disposed between the positive electrode and the negative electrode, an electrolyte, and an organic solvent. Also, with respect to the positive electrode and the negative electrode, an active material layer including a positive electrode active material or a negative electrode active material may be formed on a current collector. A lithium-containing metal oxide, such as $LiCoO_2$ and $LiMn_2O_4$, is generally used as the positive electrode active material in the positive electrode, and, accordingly, a carbon-based active material or silicon-based active material containing no lithium is used as the negative electrode active material in the negative electrode.

Particularly, the silicon-based active material among the negative electrode active materials is attracting attention, because it has a capacity approximately 10 times higher than that of the carbon-based active material, and is advantageous in that high energy density may be achieved even with a thin electrode due to its high capacity. However, the silicon-based active material has not been widely used due to problems of volume expansion due to charge and discharge and the resulting degradation of life characteristics.

It is known that a binder with strong stress, such as polyacrylic acid, is used to solve the volume expansion/contraction problem of the silicon-based active material. However, with respect to the binder, there is a limitation in that problems, such as distortion, breakage, and bending of the negative electrode, occur due to the excessively strong stress.

Accordingly, there is an urgent need to develop a binder composition for a negative electrode which may improve life performance by providing flexibility to the negative electrode while easily controlling the volume expansion/contraction of the silicon-based active material.

Korean Patent No. 10-1591712 discloses a binder for a negative electrode for a lithium secondary battery, but has not been able to present an alternative to the above-described problems.

PRIOR ART DOCUMENT

Patent Document

Korea Patent No. 10-1591712

DISCLOSURE OF THE INVENTION

Technical Problem

An aspect of the present invention provides a binder composition for a negative electrode which may improve life characteristics of the negative electrode by providing flexibility to the negative electrode while sufficiently controlling volume expansion/contraction due to charge and discharge of a negative electrode active material when used in the negative electrode.

Another aspect of the present invention provides a negative electrode, which is formed of a negative electrode slurry including the above-described binder composition for a negative electrode, and a secondary battery including the negative electrode.

Technical Solution

According to an aspect of the present invention, there is provided a binder composition for a negative electrode which includes: a binder polymer containing at least one first functional group selected from the group consisting of a hydroxy group and a carboxyl group; and a crosslinked polymer containing at least one second functional group selected from the group consisting of an amino group and an isocyanate group, wherein the crosslinked polymer is included in an amount of 1.5 parts by weight to 8.5 parts by weight based on 100 parts by weight of the binder polymer.

According to another aspect of the present invention, there is provided a negative electrode which includes: a negative electrode collector; and a negative electrode active material layer formed on the negative electrode collector, wherein the negative electrode active material layer is formed of a negative electrode slurry including a negative electrode active material and the above-described binder composition for a negative electrode.

According to another aspect of the present invention, there is provided a secondary battery which includes: the above-described negative electrode; a positive electrode facing the negative electrode; a separator disposed between the negative electrode and the positive electrode; and an electrolyte.

Advantageous Effects

A binder composition for a negative electrode of the present invention is characterized in that it includes a binder polymer and a crosslinked polymer which each have a specific functional group, and the crosslinked polymer is included in a specific amount with respect to the binder polymer. When the binder composition for a negative electrode of the present invention is used in the negative electrode, a binder network may be formed by forming a bond between the functional groups which are included in the binder polymer and the crosslinked polymer, and, accordingly, the binder polymers may form a crosslinked structure. The binder composition for a negative electrode, which may form the crosslinked structure, may improve flexibility of the negative electrode to an excellent level while maintaining strong stress of the binder polymer at an appropriate level. Accordingly, in a case in which the binder composition for a negative electrode of the present invention is used in the negative electrode, the binder composition for a negative electrode of the present invention may significantly improve life performance of the negative electrode by preventing an electrode breakage and distortion phenomenon due to strong stress of a binder while controlling volume expansion/contraction of a negative electrode active material to a desirable level.

BRIEF DESCRIPTION OF THE DRAWING

The FIGURE is a graph illustrating cycle capacity retentions of Example 1, Example 2, and Comparative Examples 1 to 4.

MODE FOR CARRYING OUT THE INVENTION

It will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the invention, based on the principle that an inventor may properly define the meaning of the words or terms to best explain the invention.

The terminology used herein is for the purpose of describing particular example embodiments only and is not intended to be limiting of the present invention. In the specification, the terms of a singular form may include plural forms unless referred to the contrary.

It will be further understood that the terms "include", "comprise", or "have" when used in this specification, specify the presence of stated features, numbers, steps, elements, or combinations thereof, but do not preclude the presence or addition of one or more other features, numbers, steps, elements, or combinations thereof.

The expression "average particle diameter ($D_{50}$)" in the present specification may be defined as a particle diameter at a cumulative volume of 50% in a particle size distribution curve. The average particle diameter ($D_{50}$), for example, may be measured by using a laser diffraction method. The laser diffraction method may generally measure a particle diameter ranging from a submicron level to a few mm and may obtain highly repeatable and high-resolution results.

Hereinafter, the present invention will be described in detail.

<Binder Composition for Negative Electrode>

The present invention relates to a binder composition for a negative electrode, and particularly, to a binder composition for a negative electrode for a lithium secondary battery.

The binder composition for a negative electrode of the present invention includes a binder polymer containing at least one first functional group selected from the group consisting of a hydroxy group and a carboxyl group; and a crosslinked polymer containing at least one second functional group selected from the group consisting of an amino group and an isocyanate group, wherein the crosslinked polymer is included in an amount of 1.5 parts by weight to 8.5 parts by weight based on 100 parts by weight of the binder polymer.

A negative electrode active material has a large degree of volume expansion/contraction due to intercalation/deintercalation of lithium, and, particularly, a silicon-based active material has a limitation in that it is difficult to put into practice due to such a very high degree of volume expansion/contraction. To address this limitation, there is an attempt to control the volume expansion/contraction of the negative electrode active material by using binders having strong stress, such as polyacrylic acid, together with the negative electrode active material. However, since these binders have excessively strong stress, a breakage phenomenon of the negative electrode active material occurs in a process of controlling the volume expansion/contraction of the negative electrode active material or the binders cause phenomena such as distortion, breakage, and bending of the negative electrode, and thus, it causes a significant degradation in life performance of a battery.

To solve this, the binder composition for a negative electrode of the present invention is characterized in that it includes a binder polymer and a crosslinked polymer which respectively contain specific functional groups, and the crosslinked polymer is included in a specific amount with respect to the binder polymer. With respect to the binder composition for a negative electrode, the binder polymers may form a crosslinked structure with each other through the formation of a bond which is formed by a reaction of the specific functional groups included in the binder polymer and the crosslinked polymer in the negative electrode. Through this crosslinked structure, the binder composition for a negative electrode may improve flexibility of the negative electrode to an excellent level while maintaining strong stress of the binder polymer in the negative electrode at an appropriate level. Accordingly, in a case in which the binder composition for a negative electrode according to the present invention is used together with the negative electrode active material in the negative electrode, since it may improve the flexibility of the electrode while controlling the volume expansion/contraction of the negative electrode active material to a desirable level, life performance of the negative electrode and secondary battery may be significantly improved.

The binder polymer contains at least one first functional group selected from the group consisting of a hydroxy group (—OH) and a carboxyl group (—COOH). The first functional group is a functional group that allows the binder polymers to crosslink with each other by forming a bond with an amino group or an isocyanate group of the crosslinked polymer to be described later, for example, an amide bond (—CO—NH—).

It is desirable that the binder polymer may have excellent resistance to the volume expansion/contraction of the negative electrode active material, particularly, the silicon-based active material, and may provide strong stress. Specifically, the binder polymer may be selected from the group consisting of polyvinyl alcohol, polyacrylic acid, polyethylene glycol, polythiophene substituted with a carboxyl group, carboxymethyl cellulose, a mixture of two or more thereof, and a copolymer of two or more thereof.

In terms of exhibiting strong stress and high modulus, the binder polymer may be preferably at least one selected from the group consisting of polyvinyl alcohol, polyacrylic acid, a mixture thereof, and a copolymer thereof, may be more preferably at least one selected from the group consisting of polyvinyl alcohol, polyacrylic acid, and a copolymer of polyvinyl alcohol and polyacrylic acid, and may be most preferably polyacrylic acid. In a case in which the binder polymer is a copolymer of polyvinyl alcohol and polyacrylic acid, the copolymer of polyvinyl alcohol and polyacrylic acid may be a copolymer including a vinyl alcohol-derived unit and an acrylic acid-derived unit in a weight ratio of 50:50 to 90:10, for example, a weight ratio of 55:45 to 80:20, and, in this case, it is desirable in terms of being able to exhibit strong stress and high modulus.

A weight-average molecular weight Mw of the binder polymer may be in a range of 10,000 to 700,000, for example, 100,000 to 500,000, and it is desirable in terms of being able to exhibit strong physical properties, such as high tensile strength and high modulus, as a polymer binder when the weight-average molecular weight Mw is within the above range.

A glass transition temperature Tg of the binder polymer may be in a range of 50° C. or higher, for example, 70° C. to 250° C., and it is desirable in terms of being able to exhibit strong physical properties, such as high tensile strength and high modulus, when the glass transition temperature Tg is within the above range.

In a case in which the binder polymer is a copolymer of two or more polymers selected from the group consisting of polyvinyl alcohol, polyacrylic acid, polyethylene glycol, polythiophene substituted with a carboxyl group, and carboxymethyl cellulose, amounts, weight ratios, molecular weights of the polymers may be adjusted so that the glass transition temperature Tg of the binder polymer is in a range of 50° C. or higher, for example, 70° C. to 250° C. Specifically, in the case that the binder polymer is a copolymer of two or more polymers, glass transition temperatures of the two or more polymers may each be in a range of 50° C. or higher, for example, 70° C. to 250° C.

The crosslinked polymer contains at least one second functional group selected from the group consisting of an amino group and an isocyanate group.

The second functional group of the crosslinked polymer and the first functional group of the binder polymer may react with each other to form a bond, and the bond, for example, may be an amide bond. Accordingly, in a case in which a negative electrode is formed of a negative electrode slurry including the binder composition for a negative electrode, since the first functional group of the binder polymer and the second functional group of the crosslinked polymer may react to be bonded to each other, a crosslinked structure may be formed. The crosslinked structure may improve the flexibility of the binder polymer while relieving the strong stress of the binder polymer.

The crosslinked polymer contains at least one second functional group selected from the group consisting of an amino group and an isocyanate group. For example, the second functional group may be a functional group capable of forming an amide bond by reacting with the first functional group of the binder polymer. Specifically, in a case in which the second functional group is an amino group, it may react with the carboxyl group in the first functional group to form an amide bond. Also, in a case in which the second functional group is an isocyanate group, it may react with the carboxyl group or hydroxy group in the first functional group to form an amide bond.

The amino group may be a group represented by —$NH_2$ and/or —NHR. In this case, R in —NHR may be selected from the group consisting of an alkyl group, an aryl group, a heteroaryl group, and an alkoxy group.

The crosslinked polymer may contain an elastic part and the second functional group bonded to an end of the elastic part. In a case in which the crosslinked polymer crosslinks the binder polymer, the flexibility of the binder polymer may be improved while the strong stress of the binder polymer is relieved by the elastic part.

The elastic part may be at least one selected from a linear polymer and a branched polymer, and the second functional group bonded to the end of the linear polymer and/or the branched polymer may react with the first functional group of the binder polymer to form a network-structured binder network.

The elastic part may include at least one selected from an alkylene unit and an alkyleneoxy unit, and may specifically include at least one unit selected from the group consisting of –$(CH_2)$—, —$(CH_2CH_2O)$—, and —$(CH_2CH(CH_3)O)$—. The number of the at least one unit selected from —$(CH_2)$—, —$(CH_2CH_2O)$—, and —$(CH_2CH(CH_3)O)$—, which is included in the elastic part, may be an integer of 10 to 1,000, and may specifically be an integer of 40 to 500.

Specifically, the crosslinked polymer may be at least one selected from the group consisting of poly(hexamethylene diisocyanate), poly(propylene glycol), tolylene 2,4-diisocyanate terminated (PPG-NCO), and multi-arm polyethylene glycol substituted with two or more amino groups. Preferably, the crosslinked polymer may be poly(propylene glycol), tolylene 2,4-diisocyanate terminated, and, in this case, it is desirable in terms of being able to more preferably form flexibility of the binder network while forming the solid binder network by rapidly performing an amide bond formation reaction with the binder polymer.

A weight-average molecular weight Mw of the crosslinked polymer may be in a range of 1,000 to 50,000, for example, 2,000 to 30,000, and it is desirable in terms of being able to form a flexible crosslinked network when the weight-average molecular weight Mw is within the above range.

A glass transition temperature Tg of the crosslinked polymer may be in a range of 25° C. or lower, preferably 0° C. or lower, and more preferably –90° C. to –20° C., and it is desirable that excellent flexibility may be provided to the binder network when the glass transition temperature Tg is within the above range.

The crosslinked polymer is included in the binder composition for a negative electrode in an amount of 1.5 parts by weight to 8.5 parts by weight based on 100 parts by weight of the binder polymer.

If, in a case in which the crosslinked polymer is included in the binder composition for a negative electrode in an amount of less than 1.5 parts by weight based on 100 parts by weight of the binder polymer, sufficient formation of the binder network is difficult and an improvement in the flexibility of the binder network is difficult. If, in a case in which the crosslinked polymer is included in the binder composition for a negative electrode in an amount of greater than 8.5 parts by weight based on 100 parts by weight of the binder polymer, it may be difficult to control volume expansion of the negative electrode active material when used in the negative electrode due to an excessive increase in the flexibility, and, since phase stability of the binder composition for a negative electrode may decrease and phase separation may occur to reduce the flexibility of the binder network as an excessive amount of the crosslinked polymer is added, it may be difficult to improve flexibility and a binding force of a desired binder.

The crosslinked polymer may be specifically included in the binder composition for a negative electrode in an amount of 1.8 parts by weight to 7.5 parts by weight based on 100 parts by weight of the binder polymer, and the phase separation of the binder composition for a negative electrode may be prevented and an effect of controlling the volume expansion of the negative electrode active material and an effect of preventing a breakage phenomenon of the negative electrode may be better achieved when the amount of the crosslinked polymer is within the above range.

The binder composition for a negative electrode may further include a solvent. The solvent may disperse the binder polymer and the crosslinked polymer, and may serve as a reaction site for the binder polymer and the crosslinked polymer.

The solvent is not particularly limited as long as it may disperse the binder polymer and the crosslinked polymer and does not inhibit a reaction between the binder polymer and the crosslinked polymer, and, for example, the solvent may include at least one selected from the group consisting of N-methylpyrrolidone (NMP), dimethylformamide (DMF), dimethyl sulfoxide (DMSO), and formamide, and may more preferably include N-methylpyrrolidone (NMP).

A method of preparing the binder composition for a negative electrode includes mixing the binder polymer and the crosslinked polymer, wherein the crosslinked polymer is mixed in an amount of 1.5 parts by weight to 8.5 parts by weight based on 100 parts by weight of the binder polymer.

Specifically, the method of preparing the binder composition for a negative electrode includes mixing a binder polymer-containing solution containing the binder polymer and a crosslinked polymer-containing solution containing the crosslinked polymer, wherein the crosslinked polymer is mixed in an amount of 1.5 parts by weight to 8.5 parts by weight based on 100 parts by weight of the binder polymer.

The binder polymer-containing solution may be prepared by adding the binder polymer to a solvent, and the crosslinked polymer-containing solution may be prepared by adding the crosslinked polymer to a solvent. In this case, the solvent is not particularly limited as long as it may disperse the binder polymer and the crosslinked polymer and does not inhibit the reaction between the binder polymer and the crosslinked polymer. For example, the solvent may include at least one selected from the group consisting of N-methylpyrrolidone (NMP), dimethylformamide (DMF), dimethyl sulfoxide (DMSO), and formamide, and may more preferably include N-methylpyrrolidone (NMP).

In the present invention, the binder polymer and the crosslinked polymer may react with each other by mixing to form a binder network. For a smooth reaction between the binder polymer and the crosslinked polymer, the method of preparing the binder composition for a negative electrode may further include a process of stirring a mixture of the binder polymer and the crosslinked polymer or a mixture of the binder polymer-containing solution and the crosslinked polymer-containing solution.

In addition, descriptions of the binder polymer and the crosslinked polymer have been described above.

<Negative Electrode>

Also, the present invention provides a negative electrode formed of the above-described binder composition for a negative electrode, particularly a negative electrode for a lithium secondary battery.

Specifically, the negative electrode according to the present invention includes a negative electrode collector; and a negative electrode active material layer present on the negative electrode collector, wherein the negative electrode active material layer is formed from a negative electrode slurry including a negative electrode active material and the above-described binder composition for a negative electrode.

Since the negative electrode according to the present invention is formed of the negative electrode slurry including the above-described binder composition for a negative electrode, the volume expansion/contraction of the negative electrode active material and the breakage and bending of the electrode may be prevented, and, accordingly, the life performance of the negative electrode may be improved to an excellent level.

The negative electrode collector is not particularly limited as long as it has high conductivity without causing adverse chemical changes in the battery. Specifically, the negative electrode collector may include at least one selected from the group consisting of copper, stainless steel, aluminum, nickel, titanium, fired carbon, and an aluminum-cadmium alloy, and may specifically include copper.

The negative electrode collector may typically have a thickness of 3 μm to 100 μm.

Microscopic irregularities may be formed on a surface of the negative electrode collector to improve adhesion of the negative electrode active material. For example, the negative electrode collector may be used in various shapes such as that of a film, a sheet, a foil, a net, a porous body, a foam body, a non-woven fabric body, and the like.

The negative electrode active material layer is present on the negative electrode collector.

The negative electrode active material layer is formed from a negative electrode slurry including the negative electrode active material and the above-described binder composition for a negative electrode.

The negative electrode active material may include a silicon-based active material. The silicon-based active material exhibits a higher capacity than a carbon-based active material, but has a limitation in that a degree of volume expansion/contraction due to charge and discharge is large. However, since the above-described binder composition for a negative electrode may simultaneously provide excellent stress and flexibility to the negative electrode when used in the negative electrode, damage of the active material due to excessive stress and distortion and bending problems of the negative electrode may be addressed while the control of the volume expansion of the silicon-based active material may be smoothly performed, and thus, the high capacity of the silicon-based active material may be preferably exhibited.

The silicon-based active material may include a compound represented by Formula 1 below.

$$SiO_x(0 \leq x < 2) \qquad \text{[Formula 1]}$$

In Formula 1, since $SiO_2$ does not react with lithium ions, it may not store lithium, and thus, x may be within the above range. Specifically, x may satisfy $0.5 \leq x \leq 1.5$, an effect of improving a binding force of the above-described binder composition for a negative electrode and an effect of preventing a breakage-distortion phenomenon of the negative electrode may be achieved to a more excellent level when x satisfies the above range.

An average particle diameter ($D_{50}$) of the silicon-based active material may be in a range of 1 μm to 15 μm, for example, 2 μm to 10 μm in terms of minimizing a side reaction with an electrolyte solution, reducing an effect of the volume expansion of the silicon-based active material, and facilitating access to a negative electrode binder for binding the active material and the current collector.

The negative electrode active material may further include a carbon-based active material together with the silicon-based active material.

The carbon-based active material may include at least one selected from the group consisting of artificial graphite, natural graphite, hard carbon, soft carbon, carbon black, acetylene black, Ketjen black, Super P, graphene, and fibrous carbon, and may preferably include at least one selected from the group consisting of artificial graphite and natural graphite.

The negative electrode active material may be included in the negative electrode slurry in an amount of 60 wt % to 99 wt %, for example, 75 wt % to 90 wt % based on a weight of a solid content of the negative electrode slurry.

In the negative electrode, the binder polymer and the crosslinked polymer in the binder composition for a negative electrode may react with each other to form a crosslinked structure. Specifically, the first functional group of the binder polymer and the second functional group of the crosslinked polymer react with each other to form an amide bond, and, accordingly, a crosslinked structure of the binder polymer and/or the crosslinked polymer may be formed. Since the crosslinked structure may form a binder network in the negative electrode, the negative electrode prepared by using the binder composition for a negative electrode may improve the flexibility of the negative electrode to an excellent level while maintaining the strong stress of the binder polymer at an appropriate level. Accordingly, the negative electrode using the binder composition for a negative electrode of the present invention may significantly improve the life performance of the negative electrode by preventing the electrode breakage-distortion phenomenon caused by the strong stress of the binder while controlling the volume expansion/contraction of the negative electrode active material to a desirable level.

The binder composition for a negative electrode may be included in the negative electrode slurry in an amount of 0.5 wt % to 20 wt %, for example, 5 wt % to 15 wt % based on the weight of the solid content of the negative electrode slurry. When the amount of the binder composition for a negative electrode is within the above range, capacity characteristics of the negative electrode may be improved while an effect of improving electrode adhesion and the flexibility of the negative electrode is sufficiently exhibited.

The negative electrode slurry may further include a conductive agent together with the negative electrode active material and the binder composition for a negative electrode.

The conductive agent may include at least one selected from the group consisting of a point-type conductive agent and a line-type conductive agent.

The point-type conductive agent may be at least one selected from the group consisting of graphite, acetylene black, Ketjen black, channel black, furnace black, lamp black, thermal black, fluorocarbon, aluminum powder, nickel powder, a conductive metal oxide, and polyphenylene derivatives, and may be preferably at least one selected from the group consisting of acetylene black, Ketjen black, channel black, furnace black, lamp black, and thermal black in terms of forming appropriate pores through which lithium ions may move by forming a point-type conductive network on a surface of the active material and in the electrode.

The line-type conductive agent may be at least one selected from the group consisting of conductive fibers such as carbon fibers, carbon nanofibers (CNF), and metal fibers; conductive tubes such as carbon nanotubes (CNT); and conductive whiskers such as zinc oxide whiskers and potassium titanate whiskers, and may more preferably be carbon nanofibers, carbon nanotubes, or a mixture thereof in terms of preventing an electrical short circuit of the active material by forming a line-type conductive network in the electrode.

The conductive agent may be included in the negative electrode slurry in an amount of 0.5 wt % to 20 wt %, for example, 5 wt % to 15 wt % based on the weight of the solid content of the negative electrode slurry.

The negative electrode slurry may further include a solvent. The solvent, for example, may include at least one selected from the group consisting of distilled water, ethanol, methanol, and isopropyl alcohol, and may preferably include distilled water.

A thickness of the negative electrode active material layer may be in a range of 10 μm to 200 μm, for example, 20 μm to 150 μm.

The negative electrode may be formed by coating the negative electrode collector with the negative electrode slurry including the negative electrode active material, the binder composition for a negative electrode, the conductive agent, and the solvent, drying, and then rolling the coated negative electrode collector.

<Secondary Battery>

The present invention provides a secondary battery including the above-described negative electrode, specifically a lithium secondary battery.

Specifically, the secondary battery according to the present invention includes the above-described negative electrode; a positive electrode facing the negative electrode; a separator disposed between the negative electrode and the positive electrode; and an electrolyte.

The positive electrode may include a positive electrode collector; and a positive electrode active material layer formed on the positive electrode collector.

The positive electrode collector is not particularly limited as long as it has high conductivity without causing adverse chemical changes in the battery. Specifically, copper, stainless steel, aluminum, nickel, titanium, fired carbon, copper or stainless steel that is surface-treated with one of carbon, nickel, titanium, or silver, or an aluminum-cadmium alloy may be used as the positive electrode collector.

The positive electrode collector may typically have a thickness of 3 μm to 500 μm.

The positive electrode collector may have a surface with fine roughness to improve adhesion to a positive electrode active material. For example, the positive electrode collector may be used in various shapes such as a film, a sheet, a foil, a net, a porous body, a foam body, a non-woven fabric body, and the like.

The positive electrode active material layer may include a positive electrode active material.

Specifically, the positive electrode active material is a compound capable of reversibly intercalating and deintercalating lithium, wherein the positive electrode active material may include a lithium transition metal composite oxide including lithium and at least one transition metal composed of nickel, cobalt, manganese, and aluminum, for example, a lithium transition metal composite oxide including lithium and transition metal containing nickel, cobalt, and manganese.

More specifically, the lithium transition metal composite oxide may include lithium-manganese-based oxide (e.g., $LiMnO_2$, $LiMn_2O_4$, etc.), lithium-cobalt-based oxide (e.g., $LiCoO_2$, etc.), lithium-nickel-based oxide (e.g., $LiNiO_2$, etc.), lithium-nickel-manganese-based oxide (e.g., $LiNi_{1-Y}Mn_YO_2$ (where $0<Y<1$), $LiMn_{2-Z}Ni_ZO_4$ (where $0<Z<2$)), lithium-nickel-cobalt-based oxide (e.g., $LiNi_{1-Y1}Co_{Y1}O_2$ (where $0<Y1<1$)), lithium-manganese-cobalt-based oxide (e.g., $LiCo_{1-Y2}Mn_{Y2}O_2$ (where $0<Y2<1$), $LiMn_{2-Z1}Co_{Z1}O_4$ (where $0<Z1<2$)), lithium-nickel-manganese-cobalt-based oxide (e.g., $Li(Ni_pCo_qMn_{r1})O_2$ (where $0<p<1$, $0<q<1$, $0<r1<1$, and $p+q+r1=1$) or $Li(Ni_{p1}Co_{q1}Mn_{r2})O_4$ (where $0<p1<2$, $0<q1<2$, $0<r2<2$, and $p1+q1+r2=2$), or lithium-nickel-cobalt-transition metal (M) oxide (e.g., $Li(Ni_{p2}Co_{q2}Mn_{r3}M_{s2})O_2$ (where M is selected from the group consisting of aluminum (Al), iron (Fe), vanadium (V), chromium (Cr), titanium (Ti), tantalum (Ta), magnesium (Mg), and molybdenum (Mo), and p2, q2, r3, and s2 are atomic fractions of each independent elements, wherein $0<p2<1$, $0<q2<1$, $0<r3<1$, $0<S2<1$, and $p2+q2+r3+S2=1$), and any one thereof or a compound of two or more thereof may be included. Among these materials, in terms of the improvement of capacity characteristics and stability of the battery, the lithium transition metal composite oxide may include $LiCoO_2$, $LiMnO_2$, $LiNiO_2$, lithium nickel-manganese-cobalt oxide (e.g., $Li(Ni_{0.6}Mn_{0.2}CO_{0.2})O_2$, $Li(Ni_{0.5}Mn_{0.3}Co_{0.2})O_2$, $Li(Ni_{0.7}Mn_{0.15}Co_{0.15})O_2$, or $Li(Ni_{0.8}Mn_{0.1}Co_{0.1})O_2$), or lithium nickel cobalt aluminum oxide (e.g., $LiNi_{0.8}CO_{0.15}Al_{0.05}O_2$, etc.), and, in consideration of a significant improvement due to the control of type and content ratio of elements constituting the lithium transition metal composite oxide, the lithium composite metal oxide may include $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, Or $Li(Ni_{0.8}Mn_{0.1}Co_{0.1})O_2$, and any one thereof or a mixture of two or more thereof may be used.

The positive electrode active material may be included in an amount of 80 wt % to 99 wt %, for example, 92 wt % to 98.5 wt % in the positive electrode active material layer in consideration of exhibition of sufficient capacity of the positive electrode active material.

The positive electrode active material layer may further include a binder and/or a conductive agent as well as the above-described positive electrode active material.

The binder is a component that assists in the binding between the active material and the conductive agent and in the binding with the current collector, wherein, specifically, the binder may include at least one selected from the group consisting of polyvinylidene fluoride, polyvinyl alcohol, carboxymethyl cellulose (CMC), starch, hydroxypropylcellulose, regenerated cellulose, polyvinylpyrrolidone, polytetrafluoroethylene, polyethylene, polypropylene, an ethylene-propylene-diene terpolymer (EPDM), a sulfonated EPDM, a styrene-butadiene rubber, and a fluoro rubber, and may preferably include polyvinylidene fluoride.

The binder may be included in an amount of 1 wt % to wt %, for example, 1.2 wt % to 10 wt % in the positive electrode active material layer in terms of sufficiently securing the binding between the components such as the positive electrode active material.

The conductive agent may be used to assist and improve conductivity in the secondary battery, and is not particularly limited as long as it has conductivity without causing adverse chemical changes. Specifically, the conductive agent may include at least one selected from the group consisting of graphite such as natural graphite and artificial graphite; carbon black such as acetylene black, Ketjen black, channel black, furnace black, lamp black, and thermal black; conductive fibers such as carbon fibers or metal fibers; conductive tubes such as carbon nanotubes; fluorocarbon; metal powders such as aluminum powder and nickel powder; conductive whiskers such as zinc oxide whiskers and potassium titanate whiskers; conductive metal oxide such as titanium oxide; and polyphenylene derivatives, and may preferably include carbon black in terms of improving the conductivity.

The conductive agent may have a specific surface area of 80 $m^2/g$ to 200 $m^2/g$, for example, 100 $m^2/g$ to 150 $m^2/g$ in terms of facilitating dispersion of the conductive agent during the preparation of a slurry for forming the positive electrode active material layer and further improving electrical conductivity.

The conductive agent may be included in an amount of 1 wt % to 20 wt %, for example, 1.2 wt % to 10 wt % in the positive electrode active material layer in terms of sufficiently securing the electrical conductivity.

A thickness of the positive electrode active material layer may be in a range of 30 μm to 400 μm, for example, 50 μm to 110 μm.

After a positive electrode slurry containing the positive electrode active material as well as selectively the binder, the conductive agent, and a solvent for forming a positive electrode slurry is coated on the positive electrode collector, the positive electrode may be prepared by drying and rolling the coated positive electrode collector.

The solvent for forming a positive electrode slurry may include an organic solvent, such as N-methyl-2-pyrrolidone (NMP), and may be used in an amount such that desirable viscosity is obtained when the positive electrode active material as well as selectively the binder and the conductive agent are included. For example, the solvent for forming a positive electrode slurry may be included in the positive electrode slurry in an amount such that a concentration of a solid content including the positive electrode active material as well as selectively the binder and the conductive agent is in a range of 50 wt % to 95 wt %, for example, 70 wt % to 90 wt %.

The separator separates the negative electrode and the positive electrode and provides a movement path of lithium ions, wherein any separator may be used as the separator without particular limitation as long as it is typically used in a lithium secondary battery, and particularly, a separator having high moisture-retention ability for an electrolyte as well as low resistance to the transfer of electrolyte ions may be used. Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous nonwoven fabric, for example, a nonwoven fabric formed of high melting point glass fibers or polyethylene terephthalate fibers may be used. Furthermore, a coated separator including a ceramic component or a polymer component may be used to secure heat resistance or mechanical strength, and the separator having a single layer or multilayer structure may be selectively used.

Also, the electrolyte used in the present invention may include an organic liquid electrolyte, an inorganic liquid electrolyte, a solid polymer electrolyte, a gel-type polymer electrolyte, a solid inorganic electrolyte, or a molten-type inorganic electrolyte which may be used in the preparation of the secondary battery, but the present invention is not limited thereto.

Specifically, the electrolyte may include an organic solvent and a lithium salt.

Any organic solvent may be used as the organic solvent without particular limitation so long as it may function as a medium through which ions involved in an electrochemical reaction of the battery may move.

Specifically, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; or a carbonate-based solvent such as dimethyl carbonate (DMC), diethyl carbonate (DEC), ethylmethyl carbonate (EMC), ethylene carbonate (EC), and propylene carbonate (PC); an alcohol-based solvent such as ethyl alcohol and isopropyl alcohol; nitriles such as R—CN (where R is a linear, branched, or cyclic C2-C20 hydrocarbon group and may include a double-bond aromatic ring or ether bond); amides such as dimethylformamide; dioxolanes such as 1,3-dioxolane; or sulfolanes may be used as the organic solvent. Among these solvents, the carbonate-based solvent may be used, and, for example, a mixture of a cyclic carbonate (e.g., ethylene carbonate or propylene carbonate) having high ionic conductivity and high dielectric constant, which may increase charge/discharge performance of the battery, and a low-viscosity linear carbonate-based compound (e.g., ethylmethyl carbonate, dimethyl carbonate, or diethyl carbonate) may be used. In this case, the performance of the electrolyte solution may be excellent when the cyclic carbonate and the linear carbonate are mixed in a volume ratio of about 1:1 to about 1:9.

The lithium salt may be used without particular limitation as long as it is a compound capable of providing lithium ions used in the lithium secondary battery. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, or $LiB(C_2O_4)_2$ may be used as the lithium salt. The lithium salt may be used in a concentration range of 0.1 M to 2.0 M. In a case in which the concentration of the lithium salt is included within the above range, since the electrolyte may have appropriate conductivity and viscosity, excellent performance of the electrolyte may be obtained and lithium ions may effectively move.

The secondary battery may be prepared by injecting an electrolyte solution after disposing the separator between the above-described negative electrode and positive electrode, according to a conventional method of preparing a secondary battery.

The secondary battery according to the present invention is suitable for portable devices, such as mobile phones, notebook computers, and digital cameras, and electric cars such as hybrid electric vehicles (HEVs), and, particularly, may be preferably used as a component battery of a medium and large sized battery module. Thus, the present invention also provides a medium and large sized battery module including the above-described secondary battery as a unit cell.

The medium and large sized battery module may be preferably used as a power source requiring high power and large capacity, for example, an electric vehicle, a hybrid electric vehicle, or a power storage device.

Hereinafter, examples of the present invention will be described in detail in such a manner that it may easily be carried out by a person with ordinary skill in the art to which the present invention pertains. The invention may, however, be embodied in many different forms and should not be construed as being limited to the examples set forth herein.

EXAMPLES

Example 1: Preparation of Binder Composition for Negative Electrode

Polyacrylic acid (weight-average molecular weight Mw: 250,000, glass transition temperature Tg: 106° C.) was used as a binder polymer. The binder polymer was prepared in the form of a binder polymer-containing solution by being added to an N-methylpyrrolidone (NMP) solvent so that a solid content was 7 wt %.

Poly(propylene glycol), tolylene 2,4-diisocyanate terminated (PPG-NCO, weight-average molecular weight Mw: 2,300, glass transition temperature Tg: −35° C.) was prepared as a crosslinked polymer. The crosslinked polymer was prepared in the form of a crosslinked polymer-containing solution by being added to an N-methylpyrrolidone (NMP) solvent so that a solid content was 30 wt %.

A binder composition for a negative electrode was prepared by mixing the binder polymer-containing solution and the crosslinked polymer-containing solution so that the crosslinked polymer was included in an amount of 2 parts by weight based on 100 parts by weight of the binder polymer. The binder composition for a negative electrode was stirred with a stirrer for 48 hours for a smooth reaction, a carboxyl group of the binder polymer reacted with an isocyanate group of the crosslinked polymer in the binder composition for a negative electrode to form an amide crosslink, and, accordingly, a plurality of binder polymers were crosslinked with each other.

Example 2: Preparation of Binder Composition for Negative Electrode

A binder composition for a negative electrode was prepared in the same manner as in Example 1 except that the binder polymer-containing solution and the crosslinked polymer-containing solution were mixed so that the crosslinked polymer was included in an amount of 5 parts by weight based on 100 parts by weight of the binder polymer.

Comparative Example 1: Preparation of Binder Composition for Negative Electrode

The binder polymer of Example 1 was used as a binder composition for a negative electrode of Comparative Example 1. Specifically, the binder polymer was prepared in the form of a binder polymer-containing solution by being added to an N-methylpyrrolidone (NMP) solvent so that a solid content was 7 wt %.

Comparative Example 2: Preparation of Binder Composition for Negative Electrode

A binder composition for a negative electrode was prepared in the same manner as in Example 1 except that the binder polymer-containing solution and the crosslinked polymer-containing solution were mixed so that the crosslinked polymer was included in an amount of 1 part by weight based on 100 parts by weight of the binder polymer.

Comparative Example 3: Preparation of Binder Composition for Negative Electrode

A binder composition for a negative electrode was prepared in the same manner as in Example 1 except that the binder polymer-containing solution and the crosslinked polymer-containing solution were mixed so that the crosslinked polymer was included in an amount of 10 parts by weight based on 100 parts by weight of the binder polymer.

Comparative Example 4: Preparation of Binder Composition for Negative Electrode

A binder composition for a negative electrode was prepared in the same manner as in Example 1 except that the binder polymer-containing solution and the crosslinked polymer-containing solution were mixed so that the crosslinked polymer was included in an amount of 20 parts by weight based on 100 parts by weight of the binder polymer.

Experimental Example

Experimental Example 1: Life Performance Evaluation

<Preparation of Negative Electrode>

Silicon-based active material SiO (average particle diameter ($D_{50}$): 5 μm) as a negative electrode active material, a conductive agent, and the binder composition for a negative electrode prepared in Example 1 were added to distilled water, as a solvent for forming a negative electrode slurry, to prepare a negative electrode slurry (solid content 30 wt %). A weight ratio of the negative electrode active material, the conductive agent, and a solid content of the binder composition for a negative electrode was 80:10:10.

The conductive agent was a point-type conductive, wherein carbon black (product name: Super C65, manufacturer: Timcal) was used.

The negative electrode slurry was coated on one surface of a copper current collector (thickness: 20 μm), as a negative electrode collector, with a loading of 4 mAh/cm², and the coated negative electrode collector was roll-pressed and dried in a vacuum oven at 130° C. for 10 hours to form a negative electrode active material layer (thickness: 25 μm), wherein this was used as a negative electrode according to Example 1 (thickness of the negative electrode: 45 μm).

Also, negative electrodes of Example 2 and Comparative Examples 1 to 4 were respectively prepared in the same manner as in Example 1 except that the binder compositions for a negative electrode of Example 2 and Comparative Examples 1 to 4 were used instead of the binder composition for a negative electrode of Example 1.

<Preparation of Coin-Type Half-Cell Secondary Battery>

Lithium metal was used as a positive electrode.

A polyethylene separator was disposed between the positive electrode and the above-prepared negative electrode of Example 1, and an electrolyte was injected to prepare a coin-type half-cell secondary battery of Example 1.

As the electrolyte, an electrolyte, in which 1 M $LiPF_6$ was added as a lithium salt to an organic solvent, in which ethylene carbonate (EC) and diethyl carbonate (DEC) were mixed in a volume ratio of 30:70, and fluoroethylene carbonate (FEC) was added as an additive in an amount of 10 wt % based on a total weight of the electrolyte, was used.

Coin-type half-cell secondary batteries of Example 2 and Comparative Examples 1 to 4 were respectively prepared in the same manner as in Example 1 except that the negative electrodes of Example 2 and Comparative Examples 1 to 4 were used instead of the negative electrode of Example 1.

<Life Performance Evaluation>

Capacity retentions were evaluated for the secondary batteries prepared in Examples 1 and 2 and Comparative Examples 1 to 4 using an electrochemical charger/discharger.

With respect to the capacity retention, charging (CC (constant current)-CV (constant voltage) charge, specifically, after being charged to 5 mV while maintaining at 0.5 C in a CC mode, cut-off charged at 0.05 C while maintaining 5 mV in a CV mode), discharging (discharged at a CC of 0.5 C to 1.5 V cut-off voltage), and resting (10 minutes) of the secondary battery were set as one cycle, and the capacity retention according to cycle repetition was evaluated by the following equation Capacity retention (%)={(discharge capacity in an $N^{th}$ cycle)/(discharge capacity in the first cycle)}×100

(where N is an integer of 1 or more)

Also, capacity retentions in a 50th cycle are presented in Table 1 below. Furthermore, a graph of normalized capacity according to cycles of the secondary batteries of Examples 1 and 2 and Comparative Examples 1 to 4 was illustrated in the FIGURE.

TABLE 1

|  | Capacity retention (%) @ $50^{th}$ cycle |
|---|---|
| Example 1 | 89.5 |
| Example 2 | 89.4 |
| Comparative Example 1 | 46.7 |
| Comparative Example 2 | 56.0 |
| Comparative Example 3 | 74.7 |
| Comparative Example 4 | 61.8 |

Referring to Table 1, with respect to the examples, it may be confirmed that they exhibited better capacity retentions than the comparative examples by preventing damage of the negative electrode active material and a breakage-bending phenomenon of the electrode while exhibiting excellent resistance to the expansion/contraction which became a problem when using the silicon-based active material.

The invention claimed is:

1. A binder composition for a negative electrode, the binder composition comprising:
    a binder polymer comprising at least one first functional group selected from the group consisting of a hydroxy group and a carboxyl group; and
    a crosslinked polymer comprising at least one second functional group,
    wherein the crosslinked polymer is present in an amount of 2 parts by weight to 5 parts by weight based on 100 parts by weight of the binder polymer,
    wherein the crosslinked polymer is poly(propylene glycol), tolylene 2,4-diisocyanate terminated, and
    wherein the binder polymer is polyacrylic acid.

2. The binder composition for a negative electrode of claim 1, wherein a weight-average molecular weight Mw of the binder polymer is in a range of 10,000 to 700,000.

3. The binder composition for a negative electrode of claim 1, wherein a glass transition temperature Tg of the binder polymer is 50° C. or higher.

4. The binder composition for a negative electrode of claim 1, wherein the crosslinked polymer comprises an elastic part and the second functional group bonded to an end of the elastic part.

5. The binder composition for a negative electrode of claim 1, wherein a weight-average molecular weight Mw of the crosslinked polymer is in a range of 1,000 to 50,000.

6. The binder composition for a negative electrode of claim 1, wherein a glass transition temperature Tg of the crosslinked polymer is 25° C. or lower.

7. A negative electrode comprising:
    a negative electrode collector; and
    a negative electrode active material layer present on the negative electrode collector,
    wherein the negative electrode active material layer is formed from a negative electrode slurry including a negative electrode active material and the binder composition for a negative electrode of claim 1.

8. The negative electrode of claim 7, wherein the first functional group of the binder polymer and the second functional group of the crosslinked polymer react with each other to form an amide bond.

9. The negative electrode of claim 7, wherein the negative electrode active material comprises a silicon-based active material.

10. The negative electrode of claim 9, wherein the silicon-based active material comprises a compound represented by Formula 1:

$$SiO_x, \text{ wherein } 0 \leq x < 2. \quad \text{[Formula 1]}$$

11. A secondary battery comprising:
the negative electrode of claim 7;
a positive electrode facing the negative electrode;
a separator disposed between the negative electrode and the positive electrode; and
an electrolyte.

* * * * *